United States Patent [19]

Krause et al.

[11] 4,173,621
[45] Nov. 6, 1979

[54] PROCESS FOR IMPROVING THE REACTIVITY OF PHOSPHORUS PENTASULFIDE

[75] Inventors: Johannes Krause, Hürth; Günter Reichert, Merten; Franz Mainzer, Hürth; Hermann Niermann, Erftstadt, all of Fed. Rep. of Germany

[73] Assignee: Hoechst Aktiengesellschaft, Fed. Rep. of Germany

[21] Appl. No.: 863,081

[22] Filed: Dec. 22, 1977

[30] Foreign Application Priority Data

Dec. 29, 1976 [DE] Fed. Rep. of Germany ....... 2659295

[51] Int. Cl.² ............................................. C01B 25/14
[52] U.S. Cl. ................................................... 423/303
[58] Field of Search .......................................... 423/303

[56] References Cited
FOREIGN PATENT DOCUMENTS 748800 12/1966 Canada ..................................... 423/303

Primary Examiner—O. R. Vertiz
Assistant Examiner—Gregory A. Heller
Attorney, Agent, or Firm—Connolly and Hutz

[57] ABSTRACT

The reactivity of phosphorus pentasulfide produced by reacting phosphorus and sulfur at a temperature higher than the melting point of phosphorus pentasulfide and allowing the resulting melt to cool and solidify on a cooling device is improved. To this end, liquid phosphorus pentasulfide is placed on, or introduced into, a cooling device; an upper liquid $P_2S_5$-layer portion A is separated immediately from a solidified lower $P_2S_5$-layer portion B which is in direct contact with the cooling surface area of the cooling device; the upper $P_2S_5$-layer portion A is recycled to a $P_2S_5$ melt; the lower $P_2S_5$-layer portion B is removed from the cooling device and collected as final product; the reactivity of the collected $P_2S_5$-layer portion B is increased to the same extent as the quantitative ratio of the $P_2S_5$-layer portion A to the $P_2S_5$-layer portion B is increased.

2 Claims, No Drawings

PROCESS FOR IMPROVING THE REACTIVITY OF PHOSPHORUS PENTASULFIDE

This invention relates to a process for improving the reactivity of phosphorus pentasulfide, which is produced by reacting phosphorus and sulfur at a temperature higher than the melting point of phosphorus pentasulfide and allowing the resulting melt to cool and solidify on a cooling device.

The reactivity of $P_2S_5$ is of particular interest in all those cases in which phosphorus pentasulfide ($P_2S_5$) is processed to give dialkyl or diaryldithiophosphoric acid. With an alcohol or phenol, $P_2S_5$ undergoes a strongly exothermal reaction, in which the controlled cooling of the reaction mixture, for which it is necessary to be maintained at a given temperature so as to avoid side reactions, has long been a problem. By the use of $P_2S_5$ of low reactivity, it has been possible to partially resolve this problem.

Various processes for making $P_2S_5$ of low reactivity have been described in which use is made of the fact that $P_2S_5$ exists in two modifications, namely in a crystalline modification of low reactivity and in an amorphous highly reactive modification.

On allowing $P_2S_5$ to solidify gradually in a pan or ingot, crystalline phosphorus pentasulfide of low reactivity is obtained, which must be comminuted subsequently. This is a time-consuming and expensive operation which has been replaced by a process, wherein use is made of a cooling drum or similar device which permits $P_2S_5$ to be cooled rapidly so as to give highly reactive partially amorphous phosphorus pentasulfide which is subsequently annealed and converted to crystalline material of low reactivity (cf. U.S. Pat. Nos. 3,023,086 and 3,146,069 and also German Patent Specification No. 1,222,480).

The demand for $P_2S_5$ of improved reactivity for commercial uses has increased with the increasing availability of improved cooling processes and the increasing demand for higher throughput rates. A cooling belt, cooling drum or dip roll is normally used for making such $P_2S_5$ of improved reactivity, the cooling media which can be used under commercially acceptable conditions including air, water or steam. In this manner it is only possible to produce $P_2S_5$ of a given limited maximum reactivity (cf. German Patent Specification "Auslegeschrift" No. 1,147,923) because of the limited thermal conductivity and thickness of the construction materials, and the temperatures which they are exposed to.

In other words, it has not been possible in this manner to meet the demands for $P_2S_5$ having the extremely high reactivity of amorphous $P_2S_5$, and other procedures for the production of $P_2S_5$ have therefore been tried (cf. Dutch Published Patent Specification No. 74,08,284), wherein liquid $P_2S_5$ is stirred into an inert quenching liquid, which has to have a high power for evaporating heat (more than 20 kcal/kg) and a boiling point between 20° and 200° C. While this process actually yields highly reactive $P_2S_5$, the facts remain that solid $P_2S_5$ is difficult to separate from the solvent and that considerable expenditure is necessary for the work-up of the solvent and the drying of $P_2S_5$.

The present invention now unexpectedly provides a process permitting the initial reactivity of $P_2S_5$ produced in customary manner and with the use of a standard cooling device to be considerably increased and the increase in reactivity to be controlled within certain limits, which comprises: placing liquid phosphorus pentasulfide on, or introducing it into, a cooling device; separating immediately an upper liquid $P_2S_5$-layer portion A from a solidified lower $P_2S_5$-layer portion B which is in direct contact with the cooling surface area of the cooling device; recycling the upper $P_2S_5$-layer portion A to a $P_2S_5$-melt; removing the lower $P_2S_5$-layer portion B from the cooling device and collecting it as final product, the reactivity of the collected $P_2S_5$-portion B being increased to the same extent as the quantitative ratio of the $P_2S_5$ portion A to the $P_2S_5$-portion B is increased.

By the use of the A and B portions in a quantitative ratio of about 0.5:1.5 it is more specifically possible to increase the initial $P_2S_5$-reactivity by about 150% (minimum increase).

By the use of the A- and B-portions in a quantitative ratio of about 1:1, it is possible to increase the initial $P_2S_5$-reactivity by about 200%, and by the use of the A and B-portions in a quantitative ratio of about 3:1, it is possible to increase the initial $P_2S_5$-reactivity by about 400% (maximum increase).

The $P_2S_5$ which is in contact with the cooling surface area of the cooling device can be removed therefrom by means of a knife, scraper or the like.

The term "initial reactivity" as used herein shall mean the reactivity of $P_2S_5$ which is invariably obtained by placing the overall quantity of $P_2S_5$ on, or introducing it into, the cooling device, allowing it to cool thereon or therein until solid, and collecting the solidified material. The reactivity is determined as the increase in temperature expressed in °C./h which occurs upon the addition of 50 g of $P_2S_5$ to 100 cc of ethylhexanol at 30° C. in a calorimeter.

The following Examples illustrate the invention.

EXAMPLE 1

Stoichiometric quantities of phosphorus and sulfur were reacted in a reactor with agitation in the atmosphere of an inert gas, and the resulting liquid $P_2S_5$ was collected in a tank. Next, it was fed at 400° C. on to a water-cooled rotating table, on which it solidified to scaly material 1.4 mm thick. The cooled scaly material was coarsely comminuted and the comminuted material was placed in a calorimeter. The initial reactivity was determined and found to be about 100° C./h.

EXAMPLE 2

Liquid $P_2S_5$ produced in the manner described in Example 1 was delivered at 400° C. from the tank on to a watercooled rotating table. The upper about ⅔ portion of the $P_2S_5$ fed on to the table was immediately scraped off while liquid and recycled to the tank. The remaining about ⅓ lower-portion which was solid glassy scaly material was coarsely comminuted, placed in a calorimeter and tested for its reactivity which was 320° C./h.

EXAMPLE 3

The procedure was as in Example 2, but about the upper ½ portion of the liquid $P_2S_5$ fed on to the rotating plate was scraped off and recycled to the tank. The final product had a reactivity of 200° C./h.

EXAMPLE 4

The procedure was as in Example 2, but the upper ¾ portion of the liquid $P_2S_5$ fed on to the plate was scraped off and recycled to the tank. The final product had a reactivity of 420° C./h.

The reactivities obtainable are indicated in the following Table:

| Quantitative ratio of recycled to solidified material | 0:1 | 1:1 | 2:1 | 3:1 |
|---|---|---|---|---|
| Reactivity in °C./h | 100 | 200 | 320 | 420 |

We claim:

1. In a process for increasing the initial reactivity of phosphorus pentasulfide produced by reacting phosphorus and sulfur at a temperature higher than the melting point of phosphorus pentasulfide and allowing the resulting $P_2S_5$ melt to cool and solidify by means of a cooling device, the improvement which comprises: regulating the increase of the reactivity by placing the phosphorus pentasulfide melt on, or introducing it into, the cooling device; separating immediately an upper $P_2S_5$ layer of remaining liquid from a lower $P_2S_5$ layer being solidified by having direct contact with the cooling surface area of the cooling device; recycling the said upper $P_2S_5$ layer to the $P_2S_5$ melt; removing the said lower $P_2S_5$ layer from the cooling device and collecting it as final product; whereby the reactivity of the collected lower $P_2S_5$ layer is increased to the same extent as the quantitative ratio of the said upper $P_2S_5$ layer to the said lower $P_2S_5$ layer is increased, said ratio being 0.5/1.5 to 3/1 with the resultant increasing of the initial reactivity of the $P_2S_5$ by a minimum of about 150% to a maximum of about 400% respectively.

2. The process as claimed in claim 1, wherein the quantitative ratio of the said upper $P_2S_5$ layer to the said lower $P_2S_5$ layer is adjusted to about 1:1 with the resultant increasing of the initial reactivity to about 200%.

* * * * *